United States Patent [19]

Makishima et al.

[11] 4,011,088
[45] Mar. 8, 1977

[54] ANTI-CORROSIVE COATING COMPOSITIONS

[75] Inventors: Hiroshi Makishima, Tokohama; Minoru Hoshino, Yokohama; Toshio Shinohara, Fujisawa; Hiroshi Nii, Kamakura; Minoru Hosoda; Toshiharu Hayashi, both of Yokohama, all of Japan

[73] Assignee: Dai Nippon Toryo Kabushiki Kaisha, Osaka, Japan

[22] Filed: Dec. 16, 1974

[21] Appl. No.: 533,359

[30] Foreign Application Priority Data

July 30, 1974    Japan .............................. 49-86644

[52] U.S. Cl. .................................... 106/1; 106/14; 106/84; 106/287 S
[51] Int. Cl.$^2$ .......................................... C09D 5/10
[58] Field of Search ............... 106/1, 14, 84, 287 S, 106/304

[56] References Cited
UNITED STATES PATENTS

| | | | |
|---|---|---|---|
| 2,998,328 | 8/1961 | Munger et al. | 106/84 |
| 3,423,229 | 1/1969 | Kompanek et al. | 106/84 |
| 3,453,122 | 7/1969 | Weldes et al. | 106/1 |
| 3,562,124 | 2/1971 | Leon et al. | 204/148 |

*Primary Examiner*—Lorenzo B. Hayes
*Attorney, Agent, or Firm*—Sughrue, Rothwell, Mion, Zinn & Macpeak

[57] ABSTRACT

An anti-corrosive coating composition having an improved weldability can be obtained by combining water-soluble potassium silicate and/or ammonium silicate as a binder with a mixture of zinc powder with iron phosphide and/or nickel phosphide as an anti-corrosive pigment.

5 Claims, No Drawings

ANTI-CORROSIVE COATING COMPOSITIONS

BACKGROUND OF THE INVENTION

This invention relates to an inorganic coating composition having an improved weldability, which comprises a solution of a water-soluble silicate as a binder and an anti-corrosive pigment composed of zinc powder and iron and/or nickel phosphide.

Highly concentrated zinc powder anti-corrosive paints comprising an organic resin such as an epoxy resin, a chlorinated rubber, a polystyrene resin, a silicone resin or the like or an inorganic binder such as ethyl silicate, an alkali silicate or the like and zinc powder incorporated in this organic or inorganic binder, such as disclosed in the specification of U.S. Pat. No. 3,562,124, have heretofore been used in the art. In processing, e.g., welding, of steel plates coated with such highly concentrated zinc powder paints, zinc fumes are scattered around the working environment and there is frequently caused a problem that workers suffer from zinc poisoning. Further, coatings formed by using an organic binder such as an epoxy resin, a chlorinated rubber, a polystyrene resin or a silicone resin are greatly damaged by welding and hence, large labors are necessary for patching damaged portions after welding. Still further, the adhesion of such coating is reduced in the vicinity of the welded portion and it is feared that the coated steel gets rusty drastically from such part. In contrast, coatings formed by using paints including such inorganic binders as mentioned above are free of such defects as observed in coatings of paints including the organic binder at the time of welding, but paints including the inorganic binder are inferior with respect to the film-forming property and the adhesion to a top coating. For example, since the sodium silicate binder disclosed in the above U.S. patent specification has a high pH and a high water-solubility, the resulting coating is easily dissolved in water. Further, a coating formed by using a paint including hydrolyzed ethyl silicate is inferior in the weldability.

SUMMARY OF THE INVENTION

It is a primary object of this invention to provide a water-soluble anti-corrosive coating composition which is highly improved in the weldability of the coating and the corrosion resistance after welding and which is excellent in the film-forming property and the adhesion to a top coating.

In accordance with this invention, there is provided a coating composition comprising (1) 5 to 80% by weight (as calculated as solids) of at least one binder selected from potassium silicate of $K_2O \cdot nSiO_2$ in which $n$ is 2.5 to 4.0 and ammonium silicate and 20 to 95% by weight (as calculated as solids) of a mixture of zinc powder with iron phosphide and/or nickel phosphide in which the weight ratio of zinc powder to phosphide is within a range of from 8 : 2 to 2 : 8. The above binder may comprise 40 to 90% by weight (as calculated as solids) of at least one member selected from potassium silicate of $K_2O \cdot nSiO_2$ in which $n$ is as defined above and ammonium silicate and 10 to 60% by weight (as calculated as solids) of at least one member selected from sodium silicate of $Na_2O \cdot mSiO_2$ in which $m$ is 2.5 to 4.0 and lithium silicate of $Li_2O \cdot pSiO_2$ in which $p$ is 3.0 to 8.0.

DETAILED DESCRIPTION OF THE INVENTION

According to the coating composition of this invention, synergistic effects are attained by the combination of the inorganic binder, iron and/or nickel phosphide and zinc powder in the above-mentioned specific ratio so that the film-forming property, the weldability of the coating and the corrosion resistance after welding are highly improved, and therefore, the coating composition of this invention fully satisfies all the requirements demanded of an anti-corrosive coating composition.

The weight ratio of zinc powder to iron phosphide and/or nickel phosphide (hereinafter referred to as "phosphide") is within a range of 8 : 2 to 2 : 8. If the proportion of zinc powder is smaller than this range, the electrochemical anti-corrosive effect by zinc powder is insufficient, and if the proportion of the phosphide is smaller than the above range, the weldability of the resulting coating is reduced. As the iron phosphide to be used in this invention, there can be mentioned, for example, a by-product formed in preparing industrially elementary phosphorus by electric furnace reduction of phosphate ores. This by-product may be represented by $Fe_2P$, $FeP$ or a mixture thereof. As the nickel phosphide, there can be mentioned $Ni_2P$, $Ni_3P_2$ and the like, and such nickel phosphide can be obtained, for example, by heating nickel pyrophosphate strongly. It is preferred that the phosphide be used in the finely pulverized form having a particle size of 1 to $10\mu$. Because of good electric conductivity, the phosphide stabilizes the electric contact among particles of zinc powder and between the surface of a metal to be protected and the zinc powder, and it enhances the electrochemical anti-corrosive activity of the zinc powder.

In this invention, since a solution of a water-soluble silicate is used as she binder, the resulting coating is completely inorganic and it is hardly burnt or decomposed at the welding step. Further, since the coating is kept alkaline, phosphoric acid is not generated on vigorous heating of iron phosphide or nickel phosphide, and therefore, damages on the coating at the welding step can be greatly eliminated.

When the mole ratio $n$ is smaller than 2.5 in the potassium silicate ($K_2O \cdot nSiO_2$) binder, the film-forming property of the coating composition is insufficient, and if the mole ratio $n$ is larger than 4.0, the stability of the binder per se is reduced.

The ammonium silicate to be used in this invention includes tetraethanol ammonium silicate, diethanol morpholinium silicate, etc.

As pointed above, sodium silicate as an inorganic binder has a high pH and a high water-solubility and it is readily dissolved in water after formation of the coating. Accordingly, the coating formed by using the sodium silicate binder is inferior in the water resistance. A coating composition including lithium silicate as the inorganic binder exhibits a great shrinkage at the film-forming step, and hence, cracks are readily formed in the resulting film. Accordingly, the lithium silicate binder is inferior to potassium silicate and ammonium silicate with respect to the film-forming property. When lithium silicate or sodium silicate alone is used as the binder, such undesired phenomena as softening, peeling and formation of cracks are readily caused in the resulting film. Further, if the pigment content in the coating composition is too small, peeling of the coating from the welded portion or formation of cracks often occurs. Moreover, the coating formed by applying a coating composition including lithium silicate or sodium silicate as the binder is inferior in the adhesion to a top coating. For these reasons, in the coating composition of this invention, a member selected from potassium silicate and ammonium silicate is used as the main binder. In this invention, however, it is permissible to incorporate a member selected from lithium silicate $Li_2O \cdot pSiO_2$ in which $p$ is 3.0 to 8.0 and sodium silicate $Na_2O \cdot mSiO_2$ in which $m$ is 2.5 to 4.0 into the above main binder in an amount of 10 to 60% by weight based on the whole binder.

In the water-soluble anti-corrosive coating composition of this invention, it is indispensable that the weight ratio of the inorganic binder to the anti-corrosive pigment (the mixture of zinc powder with iron phosphide and/or nickel phosphide) should be within a range of from 5 : 95 to 80 : 20. If the proportion of the pigment is larger than this upper limit, the film-forming property of the composition is drastically degraded, and if the proportion of the binder is larger than the above upper limit, the corrosion resistance of the resulting coating is reduced.

In this invention, it was found that by using iron phosphide and nickel phosphide in combination, the weldability of the coating and the corrosion resistance after welding can be highly improved. It is construed that this effect may probably be due to the fact that when such phosphides are combined with zinc powder, nickel phosphide acts as a good cathode in an electrochemical local battery formed and promotes activation of zinc powder as the anode.

In the case of the conventional organic or inorganic coating compositions free of such phosphide, it is extremely difficult to weld coated products if the thickness of the coating is 20 $\mu$ or larger. In contrast, in the case of an inorganic coating containing the phosphide, which is formed according to this invention, welding is possible even if the coating has a thickness of 50 $\mu$. It is considered that this effect may probably be due to the fact that by using the phosphide in combination with the above inorganic binder, the electric conductivity of the coating is improved and since a good electric conductivity is attained at the welding step, the welding rate can be increased and hence, the width of the burnt coating or film can be greatly reduced.

It has been confirmed that even if the phosphide is incorporated into a zinc powder paint including an organic binder or other inorganic binder such as ethyl silicate, no substantial improvement of the weldability can be attained.

Still further, the conventional zinc powder paint including ethyl silicate as an inorganic binder is disadvantageous in that if welding is conducted to the insufficiently dried film, the width of the burnt coating is drastically increased.

In contrast, in the coating formed by using the water-soluble coating composition of this invention, even if welding is conducted to the insufficiently dried film, the appearance of the welded portion is not at all different from the appearance of the welded portion formed when welding is conducted to the completely dried film. Therefore, the coating composition of this invention can be clearly distinguished from the conventional coating composition including ethyl silicate as the binder.

Preferred embodiments of the composition of this invention will now be illustrated in more detail by reference to the following Examples. In Examples and Comparative Examples all of the "parts" and "%" are by weight unless otherwise indicated.

EXAMPLE 1

| Formulation | Parts by weight |
|---|---|
| Aqueous solution of potassium silicate (mole ratio n being 3.5 and the solid content being 30%) | 66 |
| Zinc powder | 32 |
| Iron phosphide | 34 |
| Nickel phosphide | 14 |

EXAMPLE 2

| Formulation | Parts by weight |
|---|---|
| Aqueous solution of ammonium silicate (product sold under tradename of Quram 3365, solid content being 25%) | 160 |
| Zinc powder | 30 |
| Iron phosphide | 9 |
| Nickel phosphide | 21 |

EXAMPLE 3

| Formulation | Parts by weight |
|---|---|
| Aqueous solution of potassium silicate (mole ratio n being 3.5 and solid content being 30%) | 17 |
| Aqueous solution of lithium silicate (mole ratio p being 5.0, solid content being 21%) | 25 |
| Zinc powder | 63 |
| Iron phosphide | 14 |
| Nickel phosphide | 13 |

EXAMPLE 4

| Formulation | Parts by weight |
|---|---|
| Aqueous solution of potassium silicate (mole ratio n being 3.5 and solid content being 30%) | 130 |
| Aqueous solution of sodium silicate (mole ratio m being 3.2 and solid content being 40%) | 100 |
| Zinc powder | 12 |
| Iron phosphide | 11 |
| Nickel phosphide | 17 |

EXAMPLE 5

| Formulation | Parts by weight |
|---|---|
| Aqueous solution of potassium silicate (mole ratio n being 3.5 and solid content being 30%) | 33 |
| Zinc powder | 45 |
| Iron phosphide | 45 |

EXAMPLE 6

| Formulation | Parts by weight |
|---|---|
| Aqueous solution of potassium silicate (mole ratio n being 3.5 and solid | 34 |

-continued

| Formulation | Parts by weight |
| --- | --- |
| content being 30%) | |
| Aqueous solution of lithium silicate (mole ratio p being 5.0 and solid content being 21%) | 50 |
| Zinc powder | 56 |
| Nickel phosphide | 24 |

EXAMPLE 7

| Formulation | Parts by weight |
| --- | --- |
| Aqueous solution of potassium silicate (mole ratio n being 3.5 and solid content being 30%) | 30 |
| Aqueous solution of ammonium silicate (sold under tradename of Quram 3365, solid content being 25%) | 40 |
| Zinc powder | 60 |
| Iron phosphide | 20 |

COMPARATIVE EXAMPLE 1

| Formulation | Parts by weight |
| --- | --- |
| Alcohol solution of ethyl silicate (Col-coat 40 having solid content of 40%) | 45 |
| Zinc powder | 65 |
| Iron phosphide | 20 |

COMPARATIVE EXAMPLE 2

| Formulation | | Parts by weight |
| --- | --- | --- |
| Main ingredients: | | |
| Zinc powder | | 35 |
| Iron phosphide | | 30 |
| Epoxy resin | | 6 } 90 |
| Xylol | | 10 |
| Methyl-iso-butyl ketone | | 9 |
| Curing solution: | | |
| Polyamide resin | | 4.0 |
| Xylol | | 4.0 |
| Isobutanol | | 2.0 |
| | Total | 100.0 |

COMPARATIVE EXAMPLE 3

| Formulation | Parts by weight |
| --- | --- |
| Aqueous solution of sodium silicate (mole ratio m being 3.2 and solid content being 40%) | 50 |
| Zinc powder | 80 |

COMPARATIVE EXAMPLE 4

| Formulation | Parts by weight |
| --- | --- |
| Aqueous solution of lithium silicate (mole ratio p being 5.0 and solid content being 21%) | 140 |
| Zinc powder | 14 |
| Iron phosphide | 34 |

-continued

| Formulation | Parts by weight |
| --- | --- |
| Nickel phosphide | 22 |

In each of the foregoing compositions, the inorganic binder was mixed with the pigment just before application. Either zinc powder or the phosphide was used in the form pulverized to an average particle size of 5 $\mu$.

The ethyl silicate, epoxy resin, polyamide resin and ammonium silicate used in the foregoing Examples and Comparative Examples are as follows:

Ethyl Silicate

Col-coat 40 (trademark for the product manufactured and sold by Nippon Col-coat), composed of a mixture of linear and branches condensates of tetraethyl orthosilicate having an average degree of condensation of about 4 to about 5.

| | |
| --- | --- |
| Appearance and Color: | colorless transparent or light yellow, finely opaque liquid |
| pH: | neutral |
| Specific Gravity: | 1.060 – 1.070 (20° C.) |
| SiO$_2$ Solid Content: | 40 – 42% by weight |

Epoxy Resin

Epikote No. 1001 (trademark for the product of Shell International Chemicals Corp. having an epoxy equivalent of 450 – 520)

Polyamide Resin

Tohmide No. 210 (trademark for the product of Fuji Kasei having an amine value of 95 ± 5)

Ammonium Silicate

| Quram 3365 (product of Philadelphia Quartz) | |
| --- | --- |
| SiO$_2$ Content: | 20.0% by weight |
| Solid Content: | 25.1% by weight |
| Specific Gravity: | 1.18 |
| Viscosity: | 450 cps at 25° C. |
| pH: | 11.3 (at 25° C.) |

Tests pieces which were used for the following weldability test and coating property test were prepared in the following manner:

Mild steel plates (JIS G 3141) having a dimension of 1000 × 100 × 8 mm were subjected to shot blasting to remove completely mil scales, rusts and oils. Compositions of Examples 1 to 7 and Comparative Examples 1 to 4 were air-sprayed on these steel plates so that coatings having a dry thickness of 50 ± 5 $\mu$ were formed. Then, the coated plates were dried at a temperature of 20° C. under a relative humidity of 75% for 168 hours. The welding conditions adopted are as follows:

| | |
| --- | --- |
| Welding rod: | according to JIS D-4301 |
| Welding method: | Gravity welding |
| Welding current: | 150 A |
| Welding voltage: | 15 V |

The weldability and coating properties were tested with respect to each coating composition to obtain results shown in Table 1.

Table 1

| Sample | Degree of Generation of Zinc Fume[1] | Burnt Width of Film[2] mm | Peel Width from Bead End[3] mm | Corrosion Resistance after Welding[4] | Adhesion to Top Coating[5] | Water Resistance[6] |
|---|---|---|---|---|---|---|
| Example 1 | A | 1 – 2 | <5 | A | 25/35 | not changed |
| Example 2 | A | 1 – 2 | <5 | A | 25/25 | not changed |
| Example 3 | B | 1 – 2 | <5 | A | 24/25 | not changed |
| Example 4 | A | 1 – 2 | <5 | A | 23/25 | discoloration local cracking |
| Example 5 | A | 1 – 2 | <5 | A | 25/25 | not changed |
| Example 6 | A | 1 – 2 | <5 | A | 23/25 | not changed |
| Example 7 | A | 1 – 2 | <5 | A | 25/25 | not changed |
| Comparative Example 1 | C | 7 – 8 | 10 – 15 | C | 22/25 | not changed |
| Comparative Example 2 | D | >10 | 25 – 30 | D | 25/25 | not changed |
| Comparative Example 3 | D | 3 – 4 | 5 – 10 | B | 10/25 | softened and peeled |
| Comparative Example 4 | B | 3 – 4 | 5 – 10 | B | 17/25 | not changed |

Notes:

1. Measurement of Degree of Generation of Zinc Fume

The butt welding was conducted at a rate of 350 mm/min in a sealed chamber having a capacity of about 25 m$^3$ so that the welded width was 10 mm and the bead length was 50 cm. A prescribed amount of the mist was collected at a height of 300 mm as measured vertically from the arc point by means of a cascade impacter MAS (manufactured by Casella Co., U.S.A.) (the flow rate of collected air being 17.5 l/min). The collected mist was dissolved in a 1.0 N nitric acid solution, and the sample was analyzed according to the atomic absorption method.

The degree of generation of the mist was evaluated based on the following scale:
A : below 10 mg/m$^3$ as calculated as Zn
B : 10 – 20 mg/m$^3$ as calculated as Zn
C : 20 – 40 mg/m$^3$ as calculated as Zn
D : above 40 mg/m$^3$ as calculated as Zn 2. The distance of the coating or film burnt by the welding heat, as measured from the bead end.

3. Peel width from the bead end

The adhesion of the coating or film was examined after welding at intervals of 5 mm from the bead end. Parallel cut lines reaching the substrate were formed on the coating at intervals of 2 mm by means of a knife, and an adhesive cellophane tape was pressed on the coating and the tape was peeled. The peel width was determined based on the width along which the coating was peeled together with the cellophane tape.

4. Corrosion resistance after welding

After welding, the sample was exposed outdoors for 6 months, and the corrosion resistance was evaluated based on the degree of rusting from the welded portion to beneath the coating according to the following scale:
A : hardly changed and good state retained
B : relatively good, rust extending width smaller than 2 mm
C : relatively bad, rust extending width of 2 – 5 mm
D : bad, rust extending width larger than 5 mm 5. Adhesion to a top coating:

| Top coat paint composition: Components | Parts by weight |
|---|---|
| Epikote No. 1001 (epoxy resin of epoxy equivalent of 450 – 520, manufactured by Shell International Chemicals Corp.) | 20 |
| Methylisobutyl ketone | 5 |

-continued

| Top coat paint composition: Components | Parts by weight |
|---|---|
| Xylol | 10 |
| Rust-preventive pigment (red lead) | 20 |
| Extender pigment (talc) | 10 |
| Coloring pigment (red iron oxide) | 10 |
| Additive | 5 |
| Tohmide No. 210 | 16 |
| Xylol | 2 |
| Isobutanol | 2 |
| Total | 100 |

The same test pieces as used in the above welding test were prepared by using compositions of Examples 1 to 7 and Comparative Examples 1 to 4. Then, the above top coat paint was brush-coated on the test pieces so that the thickness in dryness of the film was 50 ± 5 μ, and the coated test pieces were dried at a temperature of 20° C. under a relative humidity of 75% for 168 hours. 25 squares of a side of 2 mm were cut on the so formed top coatings, and the adhesion to the top coating was determined according to the peeling test using an adhesive cellophane tape. In each of values given in the column "Adhesion to Top coating," the denominator indicates the total number of cut squares formed on the top coating and the numerator indicates the number of squares left after peeling of the adhesive cellophane tape. For instance, the value "23/25" indicates that among 25 squares, 23 squares were left unpeeled even after peeling of the cellophane tape.

6. Water resistance test

The same test pieces as used in the welding test were prepared by using compositions of Examples 1 to 7 and Comparative Examples 1 to 4, and they were immersed in distilled water maintained at 50° C. for 5 hours and the change of the state was examined with respect to each test piece.

What we claim is:

1. A water-soluble anti-corrosive coating composition having improved weldability, which comprises (1) 5 to 80% by weight (as calculated as solids) of a binder composed of at least one member selected from potassium silicate of $K_2O \cdot nSiO_2$ wherein $n$ is from 2.5 to 4.0 and organic ammonium silicate and (2) 20 to 95% by weight (as calculated as solids) of a mixture of zinc powder with at least one member selected from iron phosphide and nickel phosphide in which the weight ratio of zinc powder to phosphide is within a range of from 8 : 2 to 2 : 8.

2. A water-soluble anti-corrosive coating composition as set forth in claim 1, wherein the organic ammonium silicate is at least one member selected from the group consisting of tetraethanol ammonium silicate and diethanol morpholinium silicate.

3. A water-soluble anti-corrosive coating composition as set forth in claim 1 wherein the phosphide is in the form pulverized to an average particle size of 1 to 10 $\mu$.

4. A water-soluble anti-corrosive coating composition as set forth in claim 1 wherein the binder is a mixture comprising 40 to 90% by weight (as calculated as solids) of at least one member selected from potassium silicate of $K_2O \cdot nSiO_2$ wherein $n$ is from 2.5 to 4.0 and organic ammonium silicate and 10 to 60% by weight (as calculated as solids) of at least one member selected from sodium silicate of $Na_2O \cdot mSiO_2$ wherein $m$ is from 2.5 to 4.0 and lithium silicate of $Li_2O \cdot pSiO_2$ wherein $p$ is from 3.0 to 8.0.

5. A water-soluble anti-corrosive coating composition as set forth in claim 4, wherein the organic ammonium silicate is at least one member selected from the group consisting of tetraethanol ammonium silicate and diethanol morpholinium silicate.

* * * * *